United States Patent [19]

Davies et al.

[11] 3,712,599

[45] Jan. 23, 1973

[54] METHOD OF PRODUCING HIGH DENSITY REFRACTORY GRAIN FROM NATURAL MAGNESITE

[75] Inventors: Ben Davies, Pittsburgh; Dwight S. Whittemore, Bethel Park, both of Pa.

[73] Assignee: Dresser Industries, Inc., Dallas, Tex.

[22] Filed: March 15, 1971

[21] Appl. No.: 124,543

[52] U.S. Cl....................................................263/52
[51] Int. Cl...................................................F27b 19/04
[58] Field of Search.........................263/52, 53, 53 A

[56] References Cited

UNITED STATES PATENTS 3,402,225    9/1968    Cameron et al......................263/53

Primary Examiner—John J. Camby
Attorney—Robert W. Mayer, Thomas P. Hubbard, Jr., Daniel Rubin, Raymond T. Majesko, William E. Johnson, Jr. and Eddie E. Scott

[57] ABSTRACT

A method for obtaining a high density refractory grain, suitable for refractory brick manufacture, from a coarsely crystalline natural magnesite by milling the crystalline magnesite to a small particle size before and after caustic calcining.

6 Claims, No Drawings

METHOD OF PRODUCING HIGH DENSITY REFRACTORY GRAIN FROM NATURAL MAGNESITE

Naturally occurring magnesite is a mineral that has found widespread application for the manufacture of basic refractories for metallurgical furnaces and for service where resistance to high temperature and corrosion by basic slags is desirable. Magnesite (magnesium carbonate) when calcined yields as its essential magnesium oxide. If given sufficiently prolonged heat treatment or by the use of artificial promoters, both of which bring about shrinkage, crystals of MgO are formed known as periclase which have a specific gravity of 3.58.

The concept of the present invention was developed while we were studying crude, massive, coarsely crystalline magnesites from Brazil. The coarsely crystalline magnesites were not in a physical state that would sinter into a dense mass. Standard processing of these materials by methods well known in the art led to a grain of poor density, i.e., a bulk specific gravity (BSG) of about 2.50 to 2.60.

It is, therefore, the object of this invention to provide a method for producing dense deadburned magnesite grain from a coarsely crystalline natural magnesite material.

In accordance with the present invention, a crude magnesite material, i.e., magnesium carbonate, is crushed to a fine particle size. The material is caustic calcined (light burned). The material are then crushed to a fine particle size of less than about 2 microns Fisher Average Diameter. The calcine is formed into shapes (above defined) and deadburned at elevated temperatures.

According to a preferred embodiment, the initial comminution results in particles having a Fisher Average Diameter of less than about 10 microns. The material is calcined at a temperature between about 1500° and 1800°F. The material may be formed into shapes, such as, briquettes, cylinders or brick prior to calcining if desired. After comminuting the calcine, the Fisher Average Diameter is less than about 1 micron. Subsequent to shaping, the calcine is deadburned at a temperature in excess of 3,000°F. to produce a grain having a bulk specific gravity of at least 3.3.

In general, the samples studied consisted of massive, polycrystalline aggregates of magnesite ($MgCO_3$) ranging in crystalline size from several millimeters (⅛ inch or more) down to a few microns. Accessory minerals primarily in the form of talc ($3MgO \cdot 4SiO_2 \cdot H_2O$) and other intermediate weathering products of an enstatite-type mineral ($MgO \cdot SiO_2$) massive, coarse to finely crystalline quartz ($SiO_2$) and complex vermiculite-chlorite mixed layer clays, were distributed throughout most of the samples. Talc-like accumulations and vermiculites occurred generally as intercrystalline or enveloping "stringers" or "pods" surrounding the magnesite rather than being dispersed in the magnesite. Quartz was usually present in a more massive form.

A typical chemical analysis of the magnesite samples studied showed the following ranges:

| | |
|---|---|
| Silica ($SiO_2$) | 0.91 – 1.10% |
| Alumina ($Al_2O_3$) | 0.08 – 0.11% |
| Iron Oxide ($Fe_2O_3$) | 0.62 – 1.71% |
| Lime (CaO) | 0.38 – 1.88% |
| Boric Oxide ($B_2O_3$) | 0.0008 – 0.014% |
| Magnesia (MgO) | 95.3 – 97.9% |
| Loss on Ignition | 51.4 – 51.7% |

Our conclusion from these mineralogical studies was that the intercrystalline placement and relative composition of various impurity minerals in the magnesite samples suggested a physical beneficiation to be a practical means of obtaining refractory-grade magnesite from the standpoint of chemistry. However, a method of deadburning the beneficiated materials had to be determined in order to make the magnesite material available for refractory production.

In our initial studies, the purpose of which was to examine various parameters involved in densifying the magnesite, the various crude samples in the form of 2 to 3 inch lumps were crushed to pass through a ⅜ inch screen. This material was then pressed into 2 inch cylinders on a Denison hydraulic press at 3,500 p.s.i. using about 1 percent silicanit and 2 percent water for bonds. Some of the samples were then calcined at each of four temperatures, 1,500°F., 1,600°F., 1,700°F. for 2 hours.

The resulting calcines, after crushing to pass through a ⅜ inch screen, remained coarse and gritty with little or no material passing 325 mesh. A portion of each sample was Raymond milled[1] ([1]Crushed to pass 35 mesh and a predominance −65 mesh) which resulted in these samples containing from 15 to 40 percent minus 325 mesh size material. All of the samples were again pressed into ⅞ inch diameter cylinders on the Denison press at 20,000 p.s.i. without added bonds, and burned for 5 hours at 3,140°F.

As can be seen from Table I below, the bulk specific gravities of the burned cylinders were low, ranging from 2.55 to 2.83. However, the higher calcining temperatures and Raymond milling appeared to result in higher burned BSG's.

TABLE I

| Calcining Temperature | 1500°F. | | 1600°F. | | 1700°F. | | 1800°F. | |
|---|---|---|---|---|---|---|---|---|
| Sizing Treatment | A[1] | B[2] | A | B | A | B | A | B |
| Bulk Specific Gravity[3] | 2.55 | 2.59 | 2.59 | 2.79 | 2.70 | 2.72 | 2.66 | 2.83 |

[1] Crushed to pass a ⅜ inch screen
[2] Raymond milled
[3] ASTM method C 357-58

In subsequent work we made a series of studies with the aim of developing a method for preparing the magnesite to obtain a BSG of around 3.40. In this work we used a single representative sample of magnesite with a 97.6 percent MgO content. Tests were made to compare magnesite samples that had pretreatment before calcining with those that had no pretreatment. In addition, the length of milling time was evaluated.

Two inch lumps were caustic calcined at 1,700°F. for 2 hours. The calcine was then crushed to minus 4 mesh in a jaw crusher and placed in a ball mill with ½ inch diameter alumina balls. The calcine was ball milled for seven periods of time between ¼ and 5 hours. The particle size of each sample was measured by the Fisher subseive sizer to determine average diameter (FAD). The milled samples were tempered with a combination of silicanit and water, then pressed on the Denison press into ⅞ inch diameter cylinders under 20,000 p.s.i. The cylinders were dried, then burned to 3,140°F. and held for 5 hours. After cooling, the bulk specific gravity (BSG) was measured. As can be seen from Table II below, the BSG gradually increased from 2.59 when the caustic magnesite was milled for 15 minutes, to 3.14 when the milling time was 5 hours.

TABLE II

| BSG | Time of Ball Milling Caustic Before Pressing (hours) | Size FAD (in Microns) |
|---|---|---|
| 2.59 | ¼ | 3.8 |
| 2.56 | ½ | 2.6 |
| 2.74 | ¾ | 1.9 |
| 2.84 | 1 | 1.5 |
| 3.00 | 1 ½ | 1.3 |
| 3.05 | 2 | 1.1 |
| 3.13 | 3 | 1.1 |
| 3.14 | 5 | 1.1 |

Table III shows the BSG of grain produced in other tests in which the crude lumps of magnesite were crushed to minus 3 mesh, tempered with silicanit and water and pressed into brick shapes at 3,000 p.s.i. before calcining. The same procedure was then followed after calcining as with the samples in Table II. The results in Table III show that the BSG gradually increased from 2.60 when the caustic magnesite was milled ¼ hour to 3.26 when milled for 5 hours.

TABLE III

| BSG | Time of Ball Milling Caustic Calcines Before Pressing (hours) | Size FAD (in Microns) |
|---|---|---|
| 2.60 | ¼ | 4.7 |
| 2.73 | ½ | 2.9 |
| 2.88 | ¾ | 2.2 |
| 2.97 | 1 | 1.8 |
| 3.10 | 1 ½ | 1.6 |
| 3.17 | 2 | 1.5 |
| 3.22 | 3 | 1.4 |
| 3.26 | 5 | 1.4 |

Thus, it is apparent that the pretreatment of the crude lump magnesite prior to caustic calcining was beneficial. In addition, in both experiments, increasing the fineness of the caustic material by increasing the milling time gradually increased the BSG of the deadburned grain.

In still further attempts to increase the density of the calcined grain, the crude lump magnesite was crushed and then ball milled for 12 hours to a Fisher Average Diameter of 1.4 microns. The fine magnesite was then mixed with 4.5 percent water and pressed into brick shapes around 3,000 p.s.i. The shapes were caustic calcined at 1,700°F. for 2 hours.

The caustic calcined magnesite shapes were crushed to pass minus 3 mesh and divided into two parts. One part (Sample A) was pressed into briquettes, the second part (Sample B) was ball milled 1½ hours to a FAD of about 1.5 microns and then briquetted. The two lots of briquettes were burned at 3,140°F. The sample ball milled once (Sample A) had a BSG of 3.19 and Sample B, which was ball milled before and after calcining, had a BSG of 3.38.

Thus, we have found that a good quality grain can be produced from coarsely crystalline natural magnesites by ball milling both before and after caustic calcining.

Additional tests confirmed this discovery. Table IV shows the results of milling four crude minus 28 mesh magnesite samples for ½, 1, 2 and 3 hours. The FAD of these powders was 5.25, 3.75, 2.55 and 1.89 microns, respectively. The ball milled materials were moistened with 4½ percent water, pressed into shapes at 3,000 p.s.i. and caustic calcined at 1,700°F. for 2 hours. The four caustic magnesite samples were then crushed, Raymond milled and ball milled for 3 hours.

The resulting FADs on the material ranged from 0.77 to 1.02, showing decreasing value with increased initial milling time. The four samples were then briquetted dry and burned at 3,140°F. for 5 hours. The resulting BSGs on the briquettes ranged from 3.32 to 3.36.

TABLE IV

| Ball Mill Time on | | | | |
|---|---|---|---|---|
| Crude Magnesite Hours | ½ | 1 | 2 | 3 |
| FAD of Crude Magnesite | 5.25 | 3.95 | 2.55 | 1.89 |
| FAD After Milling Calcine for 3 Hours | 1.02 | 1.15 | 0.95 | 0.77 |
| BSG of Briquettes After Burn | 3.32 | 3.34 | 3.36 | 3.34 |

While the invention has been described with regard to certain embodiments and examples, it should be understood that it may be applied to other embodiments without departing from the spirit and scope of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A method for producing a dense magnesite grain comprising crushing a crude magnesite material to a fine particle size, caustic calcining the material, crushing the calcined material to a fine particle size of less than about 2 microns Fisher Average Diameter, forming the calcine into shapes and deadburning said shapes.

2. The method of claim 1, in which the calcined material are crushed to Fisher Average Diameter of less than about 1 micron.

3. The method of claim 1, in which the crude magnesite material is crushed to Fisher Average Diameter of less than about 10 microns.

4. The method of claim 1, in which the material is calcined at a temperature of between 1,500° and 1,800°F.

5. The method of claim 1 in which the grain has a bulk specific gravity of at least 3.3.

6. The method of claim 1 in which the shapes are deadburned at a temperature in excess of about 3,000°F.

* * * * *